Dec. 26, 1950     R. E. PRICE     2,535,549
CAM GRINDING MACHINE
Filed Oct. 14, 1948
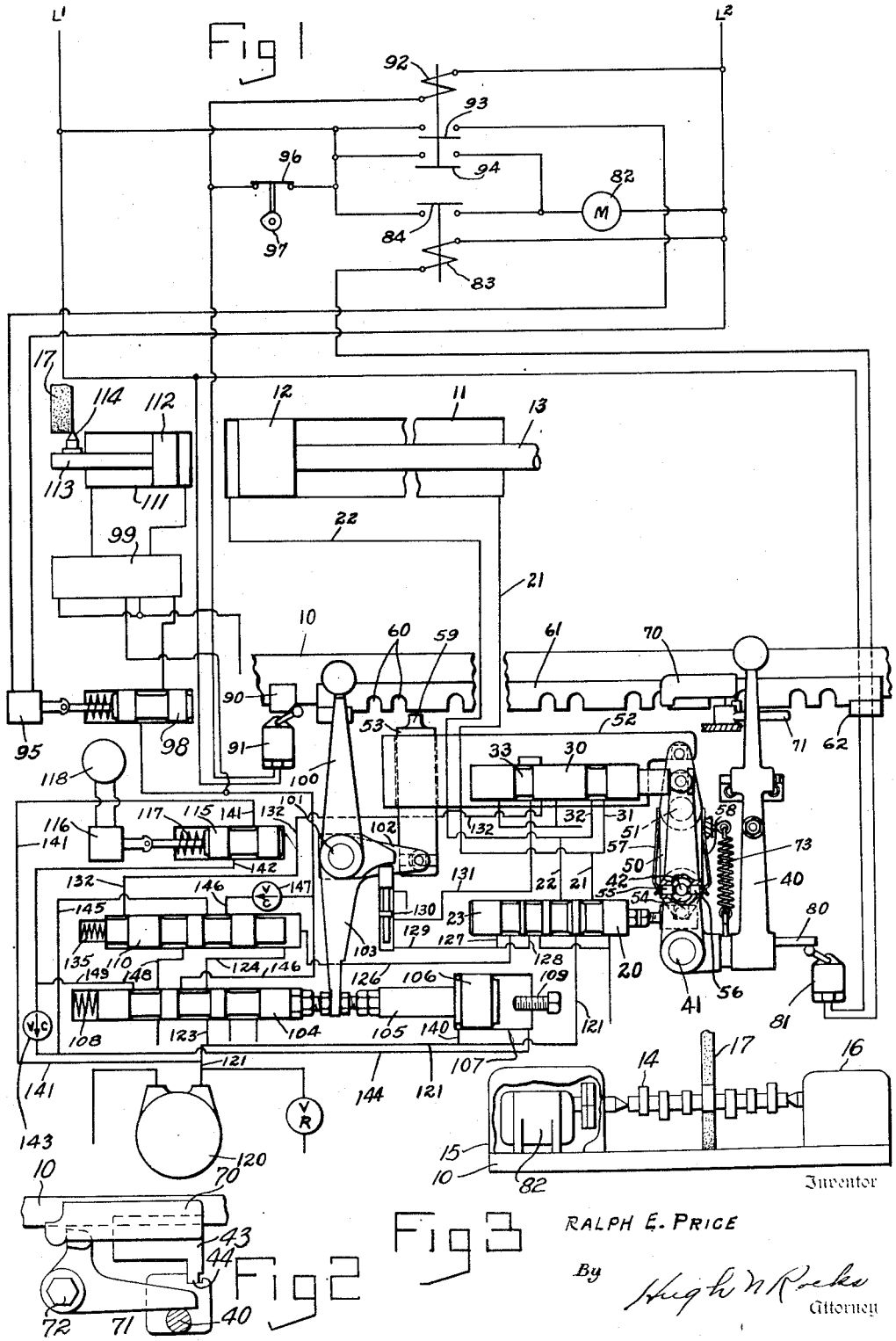
Inventor
RALPH E. PRICE
By Hugh N Rocke
Attorney Patented Dec. 26, 1950

2,535,549

UNITED STATES PATENT OFFICE 2,535,549

CAM GRINDING MACHINE

Ralph E. Price, Highfield, Md., assignor to Landis Tool Company, Waynesboro, Pa.

Application October 14, 1948, Serial No. 54,370

5 Claims. (Cl. 51—72)

1

This invention relates to grinding machines, particularly machines having an intermittent traverse movement for grinding spaced portions of a work piece, such as a cam shaft.

It is an object of this invention to provide improved means for controlling rotation of the work and dressing the grinding wheel in predetermined timed relation.

Similar machines are shown more in detail in Patent No. 2,015,414, granted September 24, 1935, which discloses a reversing and indexing mechanism resembling that described herein; Patent No. 2,192,308, granted March 5, 1940, showing a dressing mechanism of the type referred to herein; and Patent No. 2,243,410, granted May 27, 1941, showing electrical and hydraulic systems used in a machine of this type.

This invention relates to the traverse and index cycle of a cam grinder and to the control of work rotation and wheel dressing between the end of one cycle and the beginning of another. The sequence of operations may be described briefly as follows:

The operator shifts the reversing lever to the right and latches it in this position. The work begins to rotate, the carriage moves to the right to position the first cam relative to the grinding wheel, the plunger drops in the notch in the spacing bar, and the timer starts to time the grinding operation. When the predetermined time has elapsed, the plunger is withdrawn and the carriage moves again to the right to the next position. As the carriage moves into position to grind the last cam, the reversing lever is unlatched and shifted to position for moving the carriage in the opposite direction, at the same time releasing a limit switch in the work drive motor circuit. Also, at the same time a dog on the spacing bar depresses a limit switch which prepares the dresser for operation as soon as fluid under pressure is available. In the depressed position, this switch also keeps the work drive motor going during the grinding of the last cam when the start switch has been released by the reversing lever.

After the last cam has been ground, the plunger is withdrawn and held in this position until the carriage is reset by moving to the left to position for starting another camshaft. As movement to the left begins, the dresser limit switch is released to start the dressing operation and stop the rotation of the work. Work rotation is stopped with the work driving dog in a position for easy removal of the work piece from the machine. The means for stopping the work in a predetermined position is disclosed in Patent No. 2,243,410, referred to above.

In the drawings:

Figure 1 is a combined hydraulic and electrical diagram of the elements essential to the control of the traverse, work drive, and wheel dressing mechanisms.

Figure 2 is a plan view of the means for unlatching the reversing lever.

Figure 3 is a diagrammatic illustration of a headstock and footstock for rotatably supporting a work piece on a work carriage.

Numeral 10 indicates the work carriage of a grinding machine. The motor for traversing said carriage consists of a cylinder 11 and a piston 12 slidably mounted in said cylinder. A piston rod 13 on said piston may be attached to said carriage in any suitable manner (not shown).

A work piece 14 is rotatably supported on carriage 10 by headstock 15 and footstock 16. When so supported, work piece 14 may be subjected to the action of a grinding wheel 17. Said wheel may be mounted in any suitable manner, as disclosed in any of the above-mentioned patents.

Fluid under pressure for moving said carriage is directed to one side or the other of piston 12 by a reversing valve 20 through lines 21 and 22. Another portion 23 of valve 20 performs a function to be described later.

A by-pass valve 30, when in central position, connects lines 21 and 22 through lines 31 and 32 respectively so that carriage 10 may be actuated by hand without being obstructed by a locked body of fluid. Said by-pass valve also has another section 33 that directs fluid to a mechanism, which will be described later.

Said reversing valve and said by-pass valve may be actuated simultaneously through a combination of levers consisting of a U-shaped lever 40 having one side longer than the other, the longer side having a knob for manual actuation of said lever. Said lever is pivoted at the lower left-hand corner thereof on a shaft 41. The short side of said lever is connected to one end of by-pass valve 30. A projecting member 80 on lever 40 engages and operates headstock limit switch 81 for starting headstock motor 82.

A second lever 50 is located behind the short side of lever 40 and pivoted at 51. The upper end of lever 50 is connected to a horizontally slidable member 52 in which a plunger 53 is slidable vertically. The lower end of lever 50 is connected to reversing valve 20. When plunger 53 is in a notch, it acts through member 52 to locate reversing valve 20 in a neutral position.

A pin 42 in the short side of lever 40 extends through a hole 54 in lever 50. Said hole is about three times the diameter of the pin 42. A pair of pins 55 and 56 is slidably mounted in lever 50 so that they extend at right angles to and engage pin 42. Movement of pins 55 and 56 is restrained by springs 57 and 58, secured to lever 50 near its pivot point and extending downwardly to engage pins 55 and 56. Thus, when lever 40 is moved to right or to left, pin 42 causes a corresponding movement of lever 50 about its pivot 51. The upper end of lever 50, being connected through sliding member 52 to plunger 53, might cause a lateral movement of said plunger except for the fact that a reduced portion 59 on said plunger is normally in engagement with any one of several notches 60 in a spacing bar 61 on carriage 10. When so restrained, the movement of lever 40 results only in shifting the pins 55 and 56 against springs 57 and 58 respectively.

When lever 40 is placed in the right-hand position, it is urged toward the carriage by a spring (not shown) and latched in this position to prevent movement either to right or to left as shown in Figure 2. Means for latching said lever consists of a finger 43 engaging a notch 44 in a portion of lever 40. When so moved, pin 42 pushes pin 55 to the right against spring 58. When plunger 53 is withdrawn from the spacing bar, lever 50 is released and spring 58 causes it to move in a counterclockwise direction and shift reversing valve 20 to the right. The carriage moves from left to right; and when the plunger drops in the next notch, the movement of the carriage carries it a short distance in the same direction so that through sliding member 52 it shifts lever 50 in a clockwise direction and moves valve 20 to the left until it shuts off the supply of fluid to cylinder 11 to stop the carriage in position for grinding another cam.

When said carriage moves into position to grind the last cam on a shaft, a dog 70 thereon engages a bell-crank 71 rotatable about a vertical pivot 72 and having one end thereof in contact with lever 40. Movement of said carriage 10 rotates said bell-crank 71 in a clockwise direction to unlatch lever 40. Spring 73 then shifts said lever 40 to its left-hand position. Thus, lever 40 through the spring-pressed pins 55 and 56 is loaded to shift valve 20 to the left as soon as plunger 53 is withdrawn. At the same time that dog 70 engages bell-crank 71, another dog 90 engages dresser limit switch 91.

The means for withdrawing plunger 53 consists of a lever 100 on shaft 101. Arm 102, also mounted on shaft 101, extends horizontally into operative engagement with plunger 53. Another arm 103, also mounted on shaft 101, extends downward between valve member 104 and piston rod 105 from piston 106 and cylinder 107.

Valve 104 controls the movement of the grinding wheel support, but as shown here it has no function except to serve as a medium for moving lever 100 and associated parts in a counterclockwise direction by means of spring 108. When so moved, lever 100 through arm 102 moves plunger 53 upward so that the reduced portion 59 thereof may enter one of the notches 60 at the proper time. When lever 100 and plunger 53 are actuated by timer piston 106 to withdraw plunger 53 from notched bar, fluid for operating said timer piston is directed to the head end of cylinder 107 by valve 115 which may be shifted to a closed position by a solenoid 116 against the action of spring 117.

Solenoid 116 is energized or deenergized as the occasion requires at predetermined intervals by means of a timing mechanism 118. Fluid under pressure for operating the various mechanisms is supplied by a pump 120 through line 121 to reversing valve 20 from which it is directed alternately through lines 21 and 22 to opposite ends of cylinder 11. Line 123 connects line 121 with valve 104 from which fluid passes through line 124, valve 110, and line 126 to the other portion 23 of reversing valve 20. From line 126 a supply of fluid under constant pressure is thus always available at said reversing valve from which it might be directed alternately through line 127 or 128 to line 129. Fluid under pressure in line 129 acts on valve 130, shifting it upwardly and uncovering line 131 leading to the left-hand section 33 of by-pass valve 30. In any position of said by-pass valve except the left-hand position, said fluid would be directed through line 132 to the left-hand end of valve 110. The force exerted on said valve by said fluid plus that exerted in the same direction by spring 135 is greater than the pressure exerted against the opposite end and, therefore, shifts said valve to the right.

Fluid from line 121 is also directed through line 140 to the left-hand end of cylinder 107. Pressure is available constantly in this end of the cylinder so that when the opposite end is connected to an exhaust passage, the piston will be moved to the right.

Another supply of fluid under pressure from line 121 passes through line 141 to solenoid-operated valve 115. When said valve is in the right-hand position, it directs said fluid through line 142, check valve 143, and line 144 to the head end of cylinder 107. When by-pass valve 30 is in the left-hand position, the fluid supplied to the left-hand end of valve 110 is blocked; and said valve remains in the position shown. In this position of valve 110, pressure is maintained by line 123 through valve 104 to line 145 through valve 110 to lines 146 and 144 to cylinder 107.

As soon as by-pass valve 30 is shifted to central or right-hand position, fluid under pressure from line 131 is directed through line 132 to shift valve 110 to the right, connecting the head end of cylinder 107 through line 144 and line 145 with line 146 which in turn is connected by valve 104 with an exhaust passage, thus permitting the constant supply of fluid under pressure in line 140 to reset piston 106.

Operation

Assuming carriage 10 to be in the extreme left-hand position with portion 59 of plunger 53 against stop 62, lever 40 is moved to the right and latched, as shown in Figure 2. Valve 20 is shifted to the right also, as is valve 30. With lever 40 in this position, projecting member 80 thereon closes headstock limit switch 81, energizes relay 83 which closes contact 84 to complete the circuit to headstock motor 82. In the right-hand position, valve 20 directs fluid under pressure from line 121 through line 22 to the head end of cylinder 11, causing piston 12 to move carriage 10 to the right until portion 59 of plunger 53 drops into the first notch 60 in response to the action of spring 108 transmitted through valve 104, arm 103, shaft 101, and arm 102.

Carriage 10 continues to move after the plunger has entered the notch until the side of the notch engages said plunger, shifting the plunger to the right. This movement is transmitted through sliding member 52 to lever 50, moving said lever in a clockwise direction and shifting valve 20 to the left until line 121 is blocked, thus preventing further flow of fluid under pressure to cylinder 12 and stopping the movement of carriage 10.

It should be noted here that lever 50 is moved in a clockwise direction while lever 40 remains stationary in its right-hand position. This movement of lever 50 while pin 42 in lever 40 remains stationary causes spring 58 to be placed in tension against pin 56.

When valve 30 moves to the right, the connection between lines 31 and 32 is broken so that fluid under pressure will not be conducted to both sides of cylinder 12. At the same time the left-hand section 23 of reversing valve 20 directs fluid under pressure from line 126 through lines 128 and 129, valve 130 and line 131 to left-hand section 33 of valve 30. With valve 30 in the right-hand position, fluid from line 131 is directed through line 132 to the left-hand end of valve 110, shifting said valve to the right to connect line 145 with line 148 leading to valve 104, which connects said line and, therefore, the head end of cylinder 107 with an exhaust passage.

The head end of cylinder 107 being thus connected with an exhaust line, the fluid under pressure always available in line 140 at the other end of said cylinder moves piston 106 to the right until stopped by adjusting screw 109. This permits the above-described action by which plunger 53 engages the first notch in the spacing bar.

After carriage 10 has been positioned for the grinding of the first cam, timer 118 may be started by any suitable means to determine the duration of the grinding operation or any part thereof.

At the end of the predetermined period, said timer deenergizes solenoid 116; and valve 115 is moved to the right by spring 117. In this position of valve 115, the fluid under pressure in line 141 is directed through line 142, check valve 143, and line 144 to the right-hand end of cylinder 107, moving piston 106 to the left. This movement of piston 106 causes arm 103 and associated parts to be rotated in a clockwise direction to withdraw plunger 53 from the first notch 60 in spacing bar 61 and also to shift valve 104 to the left against spring 108.

In this position valve 104 connects line 142 with exhaust through line 149, thus by-passing the supply of fluid to cylinder 107 and temporarily preventing further withdrawal of plunger 53 from the spacing bar. In this position also, fluid under pressure from line 123 is directed to line 146, check valve 147, valve 110, line 145 to line 144 and cylinder 107 to continue the leftward movement of piston 106 and thus to complete the withdrawal of plunger 53. The slight delay in complete withdrawal of the plunger permits the withdrawal of the work cradle to inoperative position before the traverse movement begins.

Because of the tension in spring 58, lever 50 is rotated in a counterclockwise direction about its pivot 51 to shift valve 20 to the right and sliding member 52 and plunger 53 to the left out of alignment with the notch from which it has just been withdrawn. The previously described indexing movement is repeated, carriage 10 moving again to the right until the plunger drops in the next notch.

As carriage 10 moves into position to grind the last cam, dog 70 engages bell-crank 71, moving it in a clockwise direction against lever 40 pushing said lever outwardly from the bed to release it from its latched position. Said lever is then moved to the right-hand position by means of spring 73. This movement releases headstock limit switch 81, shifts valve 30 to the left-hand position and puts spring 57 in tension. Valve 20 remains in central position.

Opening switch 81 deenergizes relay 83 and opens the circuit to motor 82 through contact 84.

Shortly before dog 70 engages bell-crank 71, dog 90 on said carriage engages dresser limit switch 91, energizing relay 92 and closing contacts 93 and 94. Closing contact 94 completes a circuit parallel to that through contact 84 and maintains motor 82 in operation after the contact 84 has been opened.

Contact 93 completes a circuit to dresser solenoid 95 to initiate a wheel dressing operation similar to those described in the above-mentioned patents. Said solenoid shifts a valve 98 to direct fluid under pressure through a reversing valve 99 alternately to opposite ends of a dresser cylinder 111. A piston 112 in said cylinder has a piston rod 113 on which a dressing diamond 114 is mounted for dressing the grinding wheel 17. However, fluid for actuating piston 112 is not available until valve 104 is shifted to the left upon withdrawal of plunger 53 after the last cam on a shaft has been ground. In this position of valve 104, fluid is directed through line 146 to said dressing mechanism.

With valve 30 in the left-hand position, the connection between lines 31 and 32 is broken so as to permit fluid under pressure to reach only the right-hand end of cylinder 11. Also in this position the left-hand section 33 of valve 30 blocks line 131, preventing flow of fluid under pressure to the left end of valve 110 so that said valve remains in the position shown.

When timer 118 functions at the end of the grinding operation on the last cam, valve 115 is returned to the right-hand position directing fluid under pressure through line 142, check valve 143, line 144 to the head end of cylinder 107, moving piston 106 to shift valve 104 to the left and withdraw plunger 53 from spacing bar 61. The withdrawal of said plunger permits spring 57 to shift lever 50 in a clockwise direction, moving valve 20 to the left and directing fluid under pressure from line 121 through line 21 to the right-hand end of cylinder 11. Piston 12 and carriage 10 move to the left, but plunger 53 is prevented from dropping into the notches 60 during this movement because valve 110 has remained in the right-hand position, thus maintaining pressure of fluid on the head end of cylinder 107 through lines 144, 145 to valve 110 and from valve 110 to line 148 to the exhaust connection in valve 104. The carriage, therefore, continues to move to the right until plunger 53 is engaged by stop 62, shifting said plunger slightly to the left and through sliding member 52 rotating lever 50 in a counterclockwise direction to return valve 20 to a neutral position and thus shut off the supply of fluid to cylinder 11.

When carriage 10 begins to move to the left, limit switch 91 is released, opening contacts 93 and 94. Opening contact 94 breaks the circuit to motor 82. However, contact 94 is by-passed through contact 96 which is actuated by a cam 97 on the headstock spindle. This cam engages the contact only when the cradle has been dropped to inoperative position, as described in the above-mentioned Patent 2,243,410.

I claim:

1. In a grinding machine, a work carriage, means for rotatably supporting a work piece thereon, means for rotating said work piece, means for effecting longitudinal movement of said carriage, means for effecting said movement intermittently for grinding axially spaced portions on a work piece, means for returning the carriage to starting position and stopping the work rotation after the last portion has been ground including a reversing lever normally in position for said return movement, a latch for holding said lever in position for said intermittent movement, a switch operated by said lever at the beginning of said intermittent movement for starting said work rotation, and means responsive to said intermittent movement for releasing said lever.

2. In a grinding machine, a work carriage, means for rotatably supporting a work piece thereon, means for rotating said work piece, means for effecting longitudinal movement of said carriage, means for effecting said movement intermittently for grinding axially spaced portions on a work piece, means for returning the carriage to starting position and stopping the work rotation after the last portion has been ground including a reversing lever normally in position for said return movement, a latch for holding said lever in position for said intermittent movement, a switch operated by said lever at the beginning of said intermittent movement for starting said work rotation, means responsive to said intermittent movement for releasing said lever, a second switch in control of said work rotation, and means responsive to said intermittent movement for actuating said switch at substantially the same time said lever is released, said second switch serving to prevent stopping work rotation until after said return movement begins.

3. In a grinding machine, a work carriage, means for rotatably supporting a work piece theron, means for rotating said work piece, means for effecting longitudinal movement of said carriage, means for effecting said movement intermittently for grinding axially spaced portions on a work piece including a spacing bar having notches thereon, a plunger and means operable normally for urging said plunger into engagement with said notches, means operable during movement of said carriage in one direction for withdrawing said plunger from each of said notches after a predetermined interval including a piston and cylinder having a constant pressure connection at one end thereof for resetting said piston and permitting a return of said plunger to contact with said spacing bar, means for returning the carriage to starting position after the last portion has been ground, and means for preventing exhaust of fluid from the other end of said cylinder during said return movement whereby to hold said plunger in withdrawn position.

4. In a grinding machine, a grinding wheel and means for dressing same, a work carriage, means for rotatably supporting a work piece thereon, means for rotating said work piece, means for effecting longitudinal movement of said carriage, means for effecting said movement intermittently for grinding axially spaced portions on a work piece, means for returning the carriage to starting position and stopping the work rotation after the last portion has been ground, including a reversing lever normally in position for said return movement, a latch for holding said lever in position for said intermittent movement, a switch operated by said lever at the beginning of said intermittent movement for starting said work rotation, means responsive to said intermittent movement for releasing said lever, a second switch in control of said dressing operation, and means responsive to said intermittent movement for actuating said starting switch, said second switch serving in conjunction with the means for returning said carriage to starting position to initiate operation of said dressing means.

5. In a grinding machine, a work carriage, a grinding wheel and means for dressing same, means for rotatably supporting a work piece thereon, means for rotating said work piece, means for effecting longitudinal movement of said carriage, means for effecting said movement intermittently for grinding axially spaced portions on a work piece, means for returning the carriage to starting position and stopping the work rotation after the last portion has been ground including a reversing lever normally in position for said return movement, a latch for holding said lever in position for said intermittent movement, a switch operated by said lever at the beginning of said intermittent movement for starting said work rotation, means responsive to said intermittent movement for releasing said lever, a second switch in control of said work rotation, and means responsive to said intermittent movement for actuating said switch at substantially the same time said lever is released, said second switch serving to prevent stopping work rotation until after said return movement begins, said second switch serving also to initiate operation of said dressing mechanism.

RALPH E. PRICE.

REFERENCES CITED

The following references are of record in the file of this patent:

UNITED STATES PATENTS

| Number | Name | Date |
|---|---|---|
| 2,015,414 | Steiner et al. | Sept. 24, 1935 |
| 2,022,178 | Belden et al. | Nov. 26, 1935 |
| 2,117,916 | Silven et al. | May 17, 1938 |